United States Patent
Levi et al.

(10) Patent No.: US 8,074,560 B2
(45) Date of Patent: Dec. 13, 2011

(54) MACHINE FOR PRODUCING ESPRESSO-TYPE COFFEE

(75) Inventors: Mario Levi, Nice (FR); Jean-Pierre Levi, Nice (FR)

(73) Assignee: UNIC (SAS), Carros (FR)

( * ) Notice: Subject to any disclaimer, the term of this patent is extended or adjusted under 35 U.S.C. 154(b) by 503 days.

(21) Appl. No.: 12/302,980

(22) PCT Filed: May 14, 2007

(86) PCT No.: PCT/EP2007/054644
§ 371 (c)(1), (2), (4) Date: Dec. 1, 2008

(87) PCT Pub. No.: WO2007/137937
PCT Pub. Date: Dec. 6, 2007

(65) Prior Publication Data
US 2009/0199720 A1     Aug. 13, 2009

(30) Foreign Application Priority Data
May 31, 2006  (FR) .................................. 06 51981

(51) Int. Cl.
*A47J 31/00*    (2006.01)
(52) U.S. Cl. .......... 99/289 R; 99/295; 99/302 R; 99/323
(58) Field of Classification Search ................ 99/295, 99/302 R, 323, 289 R
See application file for complete search history.

(56) References Cited

U.S. PATENT DOCUMENTS

| | | | | |
|---|---|---|---|---|
| 3,384,004 | A | * | 5/1968 | Perlman et al. ............. 99/289 R |
| 5,638,741 | A | * | 6/1997 | Cisaria ............................. 99/295 |
| 7,444,927 | B1 | * | 11/2008 | Crosville et al. ................ 99/295 |
| 7,531,198 | B2 | * | 5/2009 | Cortese .......................... 426/433 |
| 2003/0056655 | A1 | * | 3/2003 | Kollep et al. .................... 99/295 |
| 2006/0144243 | A1 | | 7/2006 | Levi et al. |
| 2009/0029021 | A1 | * | 1/2009 | Nielsen et al. ................ 426/433 |

FOREIGN PATENT DOCUMENTS

FR    2 849 760    7/2004

OTHER PUBLICATIONS

International Search Report dated Oct. 26, 2007, from corresponding PCT application.

* cited by examiner

*Primary Examiner* — Reginald L Alexander
(74) *Attorney, Agent, or Firm* — Young & Thompson

(57) ABSTRACT

An extraction device for production of infusion drinks, includes an infusion chamber made up of a fixed part (1) and a moving part (2) which opens and closes the infusion chamber, a lever (20), mounted to rotate relative to an axle (A) and drive the moving part (2) in rotation relative to an axle (B), via a sliding pivot joint between the lever (20) and the moving part (2), characterized in that the axle (B) of rotation of the moving part (2) is arranged on an element mounted such as to move relative to the fixed part (1) to bring the moving part (2) closer to or further away from the fixed part (1).

15 Claims, 4 Drawing Sheets

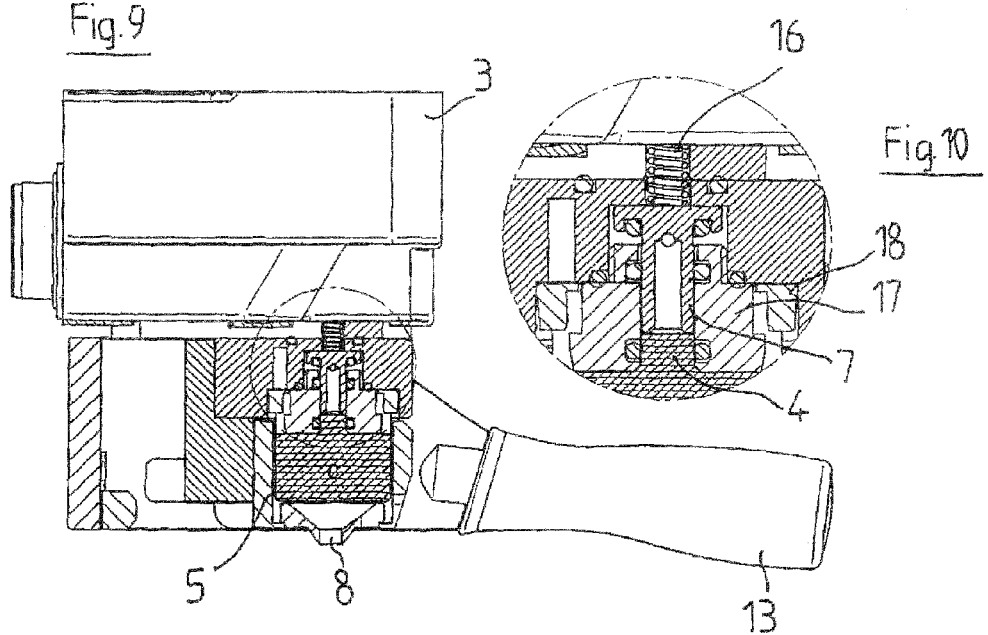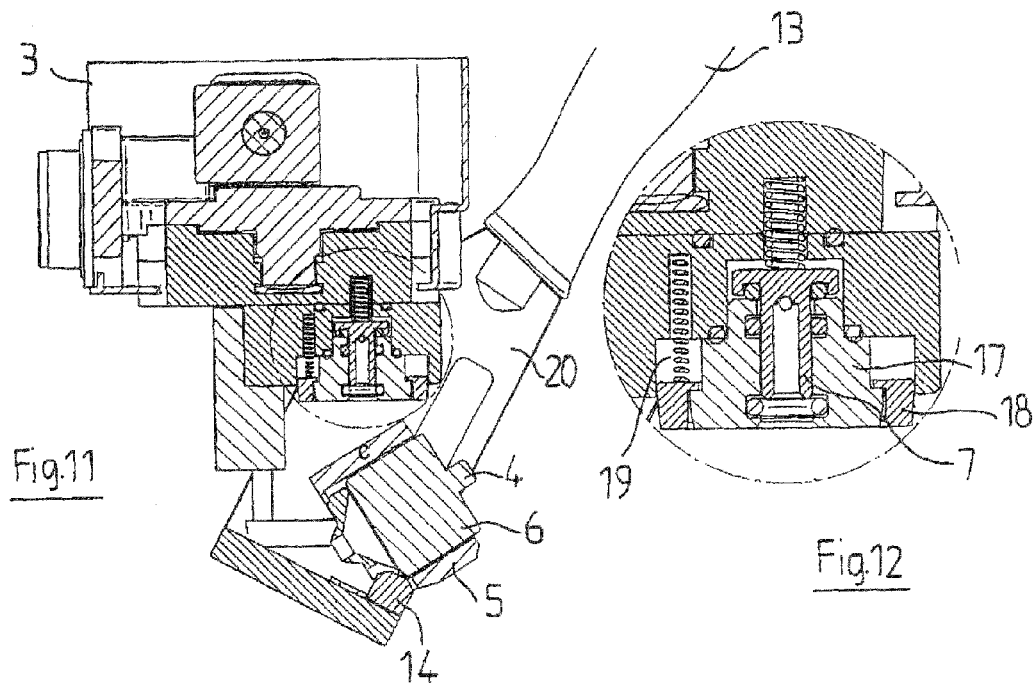

MACHINE FOR PRODUCING ESPRESSO-TYPE COFFEE

BACKGROUND OF THE INVENTION

1. Field of the Invention

The present invention relates to an extraction system for making infused beverages and in particular coffee from ground coffee.

The invention will apply particularly to espresso-type coffee machines using cartridge or capsule-type packages of ground coffee.

2. Related Art

All manufacturers are constantly trying to improve the practicality in use of coffee machines, more especially since the appearance of disposable packages of ground coffee which are easy to handle.

Various systems concerning the phases of ground coffee introduction, closing of the infusion chamber, infusing, opening of the infusion chamber and ejection of the ground coffee have already been proposed.

Document FR-A-2849760 shows a device and a machine for the extraction of a substance for making beverages comprising infusion chambers that are capable of being opened and closed by a lever system mounted rotatably relative to the machine frame so as to drive a moving part of the infusion chamber along another axis of rotation.

Such an actuation system gives overall satisfaction but there has appeared a reason or need to improve it, in particular to cope with cartridge or capsule type packages of ground coffee.

SUMMARY OF THE INVENTION

This invention is within this scope and proposes for this purpose a device for the extraction of a substance for the production of a beverage by infusion associating rotational mobility with translational mobility of a moving part of the infusion chamber relative to a fixed part. All this system is combined with a lever-operated drive system with pivot-type linkage sliding advantageously between the lever and the moving part but not limitatively executed by a system of pivoting axes and oblong holes.

Such a device has the advantage of allowing large vertical movements of the moving part in order to easily access its internal volume receiving the ground coffee, for example, packaged in capsules or cartridges. This vertical movement also permits greater angular movement of the moving part allowing better angular orientation for its manual extraction or its automatic ejection.

In the drive method proposed by the invention, all these stages are performed by only one operation of the lever by the user, the drive means used allowing the mobility phases of the moving part of the infusion chamber to be sequenced.

Other goals and advantages will appear during the description which follows which shows a non-restrictive preferred embodiment of the invention.

First of all, it has to be remembered that the invention concerns a device for extracting a substance to make beverages by infusion comprising:

an infusion chamber consisting of a fixed part and a moving part which opens and closes the infusion chamber.

A lever mounted rotatably relative to an axle (A), able to rotate the moving part relative to axle (B) by a pivot-type linkage sliding between the lever and the moving part, characterised in that rotational axle (B) of the moving part is situated in an element that is fitted to translate relative to the fixed part in order to bring together or move away the moving part from the fixed part.

This device may include the following but non-limiting advantages:

device comprising elastic means pushing the element assembled to translate towards a position in which the moving part has been moved away from the fixed part.

device in which the element assembled in translation includes a rod assembled in a guiding-housing, device in which the guiding-housing is formed in the rear face of the fixed part, device in which the element assembled to translate consists of a longitudinal part oriented according to the direction of translation and a transversal part on which is situated rotational axle (B) of the moving part, device in which the sliding pivot-type linkage is situated between rotation axle (B) of the moving part and rotational axle (A) of the lever, device in which the sliding pivot-type linkage consists of an oblong hole formed in the lever which co-acts with drive axle (C) on which the moving part is rotatably fitted, device in which the rear face of the fixed part consists of a stop to limit the rotation of the moving part, device in which the moving part consists of at least one receptacle for a substance to be infused, the bottom of the receptacle comprising an opening to allow the passage of a pusher into the receptacle volume in order to initiate extraction of the package after use, device in which the pusher is formed on the lever in order to pass into the volume of the receptacle at the end of rotation of the moving part, device which comprises a body equipped with a head injecting hot water into a packaging of the substance to be infused, the head being mobile and capable of applying or piercing an end-piece formed on the package and the lower surface of the body capable of bearing on the upper face of the package around the end-piece, device in which the body is surrounded by a crown bearing elastically on the upper face of a receptacle receiving the package in the moving part, device in which the rotational movement of the moving part is between 45° and 90°.

device in which the rotational movement of the moving part is greater than 90°.

The present invention also concerns a machine for making beverages incorporating a device according to the invention.

BRIEF DESCRIPTION OF THE DRAWINGS

The attached drawings are given as examples and are not restrictive, They show only one embodiment of the invention and will enable it to be easily understood.

FIG. 9 shows the extraction device co-acting with a package of ground coffee in the closed position, FIG. 10 is a detailed view at the level of the water injection part.

FIG. 11 shows this co-acting in the open position and FIG. 12 is a detailed view of it.

DETAILED DESCRIPTION

Figure 1:
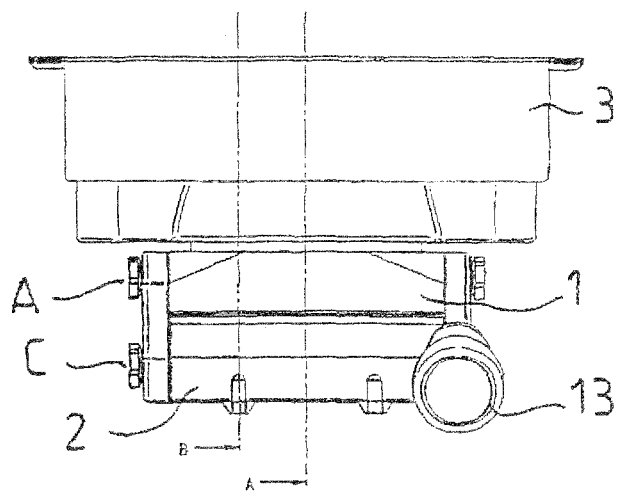
FIGS. 1 to 3 show one example of the invention in a side view in three successive positions, respectively closed, intermediate and open.

The invention device is incorporated in a machine particularly suited to the preparation of coffee beverages obtained from the infusion of a substance of the type ground coffee. For this purpose, the device is mounted on chassis 3 of the machine by any usual means so as to receive hot water under pressure obtained conventionally from a boiler and a pump.

This extraction device comprises an infusion chamber which is defined here as being of sufficient volume to receive the ground coffee, packaged or not, and at the level of which hot water injection takes place through the ground coffee.

To allow the introduction, infusing and ejection of the ground coffee, the infusion chamber is formed by a fixed part 1 and a moving part 2. The moving part 2 executes the successive operating phases.

It will be noted that the figures appended to the present description refer to an embodiment using packages 6 of ground coffee. In the description which follows, reference will only be made to this example, although non-restrictive, given that the device can also operate with non-packaged ground coffee in an easy-to-handle filter cup.

Moreover, the example shown consists of two infusion chambers ready to operate simultaneously or separately with two packages 6. However, this example is not restrictive and the invention device may apply to a system using only one package 6.

Figure 2:
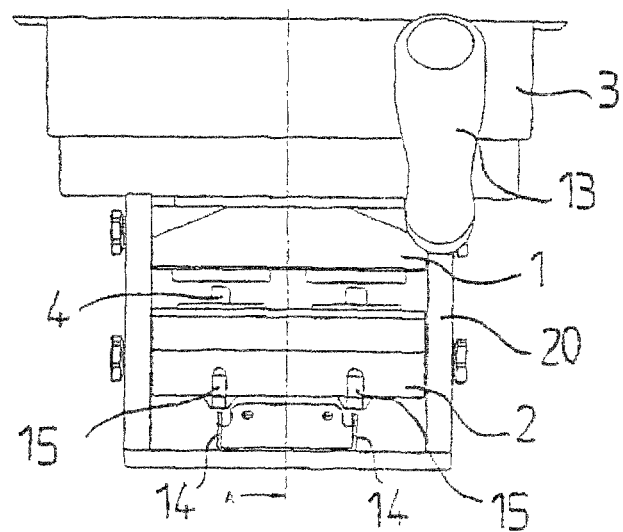
Figure 3:
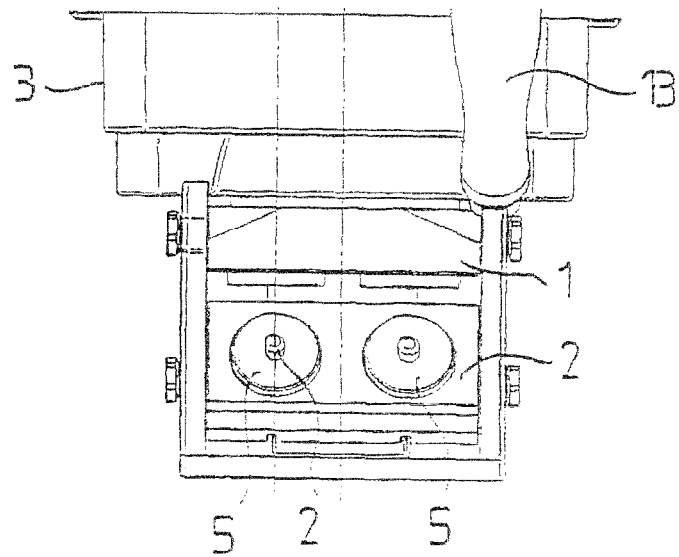

In the example shown on FIGS. 1 to 3, moving part 2 is operated through a lever 20 equipped with a handle 13 by the operator, together with a stirrup type system enclosing moving part 2. Lever 20 is itself being mounted to rotate around axle A relative to frame 3 of the machine.

Figure 4:
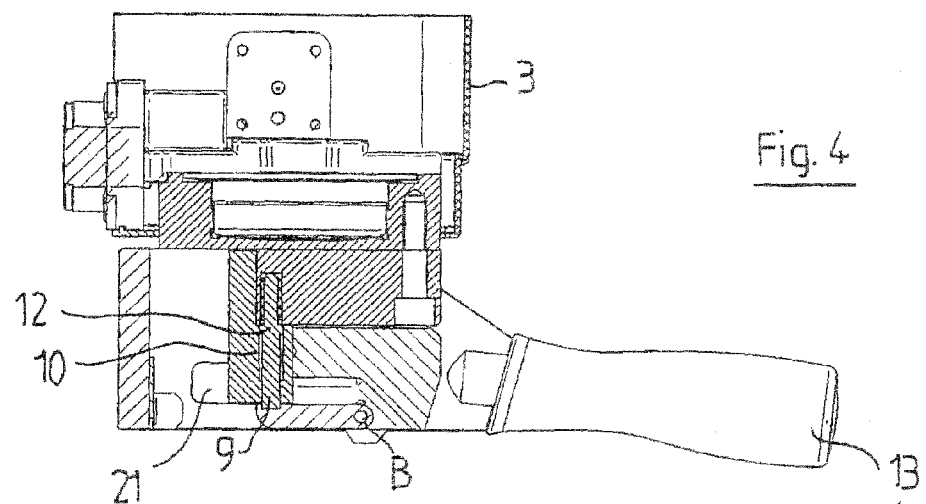
FIGS. 4 to 6 show the invention device according to the lines of Section AA on FIGS. 1 to 3 respectively.
Figure 5:
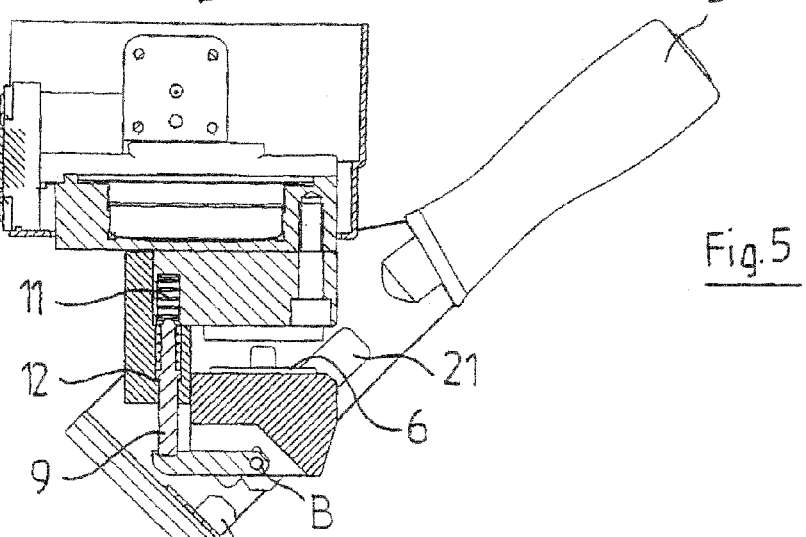
Figure 6:
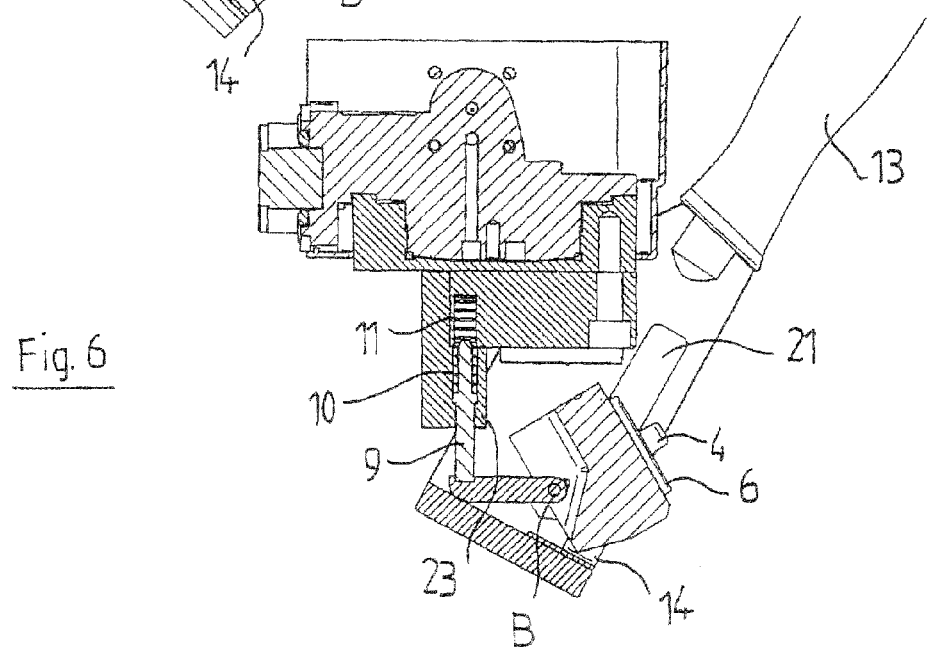

The system operating moving part 2 can be more clearly seen on FIGS. 4 to 6.

These figures show rotational axle B of moving part 2 relative to frame 3 and fixed part 1. In parallel, a sliding pivot linkage is formed between lever 20 and moving part 2 so as to generate drive. By linkage of the sliding pivot is meant a kinematic linkage allowing rotation of the moving part around an axle, itself capable of translation relative to lever 20.

Figure 7:
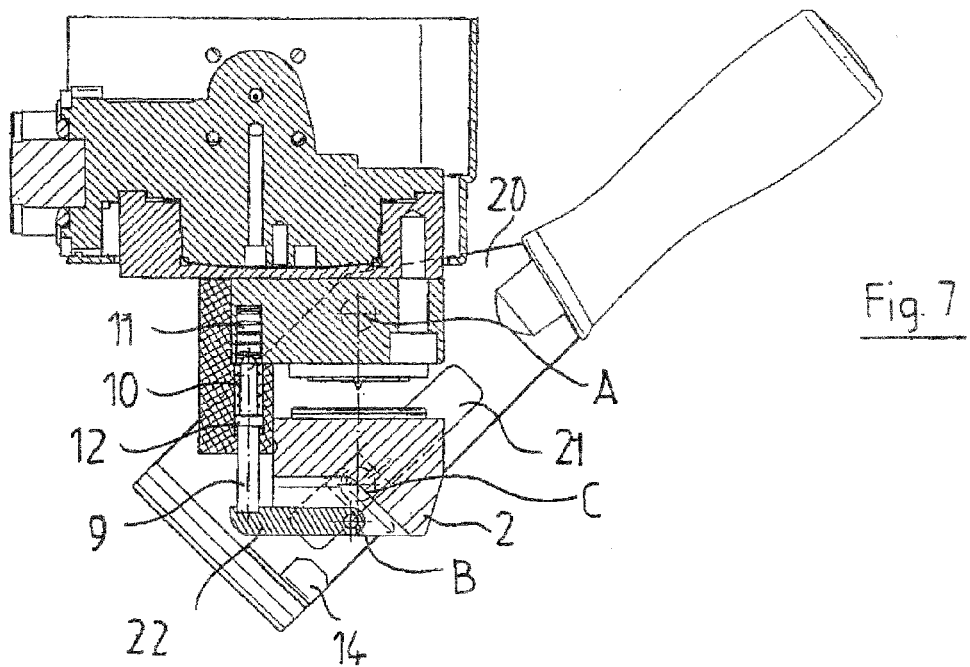
FIG. 7 is a sectional view of the invention in the intermediate position in the vertical translation phase.

In the example shown, the sliding pivot linkage takes the form of a pair of oblong holes 21 formed on two lateral sections of lever 20 so as to co-act with axle C on which moving part 2 is rotatably mounted. FIG. 7 shows three rotational mobilities of the invention, that of lever 20 relative to axle A, of moving part 2 relative to axle B and of moving part 2 relative to axle C.

According to the invention, axle B is formed on a translational element 9 assembled to translate relative to fixed part 1.

This translational mobility allows moving part 2 to move towards or away from moving part 1. The fit-up of the two parts, fixed part 1 and moving part 2, only occurs in translation, which creates a better seal and eliminates friction between the two parts. Moreover, the possibility is offered of the moving part moving further away from the fixed part and ensuring greater accessibility of moving part 2, in particular in the loading and unloading of packages 6.

In a preferred arrangement, FIGS. 4 to 7 in particular show a translational element 9 in the form of a rod equipped with a vertical section and fitted to translate in a housing 10 until meeting spring 11 with default recall of rod 9 in the remote position relative to fixed part 1.

Element 9 also advantageously comprises a longitudinal part 22 extending from the rear part of fixed part 1 towards the front part, appreciably at the level of the underside of moving part 2. Axle of rotation B is positioned advantageously close to longitudinal part 22.

Axle B is very slightly offset towards the rear relative to axle C so that in the final phase the rotation of lever 20 generates rotation of moving part 2. The position close to axles B and C ensures great angular displacement between 0 and 90°, especially if manual unloading is required, that is to say more than 90° if it is required to eject by force of gravity.

With further reference to FIGS. 4 to 7, element 9 and guiding-housing 10 are formed at the level of the rear face of fixed part 1. At this level, a surface on stop 23 is able to co-act with moving part 2 so as to limit its rotational movement, especially during upward movement of moving part 2 towards fixed part 1.

Moving part 2 comprises at least one receptacle 5 defining an internal volume accommodating a package 6. Receptacle 5 has an opening in its lower part to create a zone 8 for beverage discharge.

The shape and the dimensions of receptacle 5 are adapted to the shapes and the dimensions of packages 6.

To facilitate the extraction of packages 6 during infusion chamber opening, according to a preferred embodiment, the device is equipped with a pusher 14 capable of being inserted inside the inner volume of receptacle 5 at the end of moving part 2 rotation so as to apply close to the lower part of package 6 and slightly or completely raise it outside the volume of receptacle 5.

An example of a pusher 4 is shown in FIG. 11 during package 6 discharge.

In the example shown, pusher 14 is created on lever 20, appreciably towards the rear of the device, the angular displacement of moving part 2 being selected so that pusher 14 is introduced inside the volume of receptacle 5 at the end of rotation.

FIGS. 9 to 12 also show an example of package 6 and the hot water part of the device acting together.

Thus, on FIG. 9, package 6 has an end-piece 4 through which hot water is introduced into package 6, with or without preliminary piercing of end-piece 4. An injection body 17 is also shown in which a central hole allows translational mobility of an injection head capable of bearing on the upper face of end-piece 4, injection body 17 itself bearing on the upper face of package 6 positioned around end-piece 4. Thus, package 6 is particularly well immobilised and sealing can take place, for example, in the form of an o-ring formed between body 17 and the cylindrical part of the lateral surface of end-piece 4.

Moreover, body 17 is surrounded by a crown 18 that can be applied on the upper surface of receptacle 5. Crown 18 is mobile in vertical translation until meeting return means of the type spring 19.

The configuration shown on FIG. 10 has been reached when the device is in the closed position. At this stage, end-piece 4 executes vertical translation of injection head 7 leading to the opening of the hot water injection circuit passing into injection head 7. Simultaneously, body 17 applies around end-piece 4 so as to maintain and ensure its sealing function. As to crown 18, this is in the retracted position due to the application of the perimeter of receptacle 5.

FIG. 11 shows the device in the open position and FIG. 12 more precisely illustrates the rest position of the hot water injection part of the device.

In this configuration, injection head 7 is deployed in body 17 and is applied against it on meeting spring 16. Hot water can no longer flow through in this configuration.

Crown 18 is also in the deployed position at this time.

Hereafter, an explanation is given of the operation of a machine incorporating this device.

Figure 8:
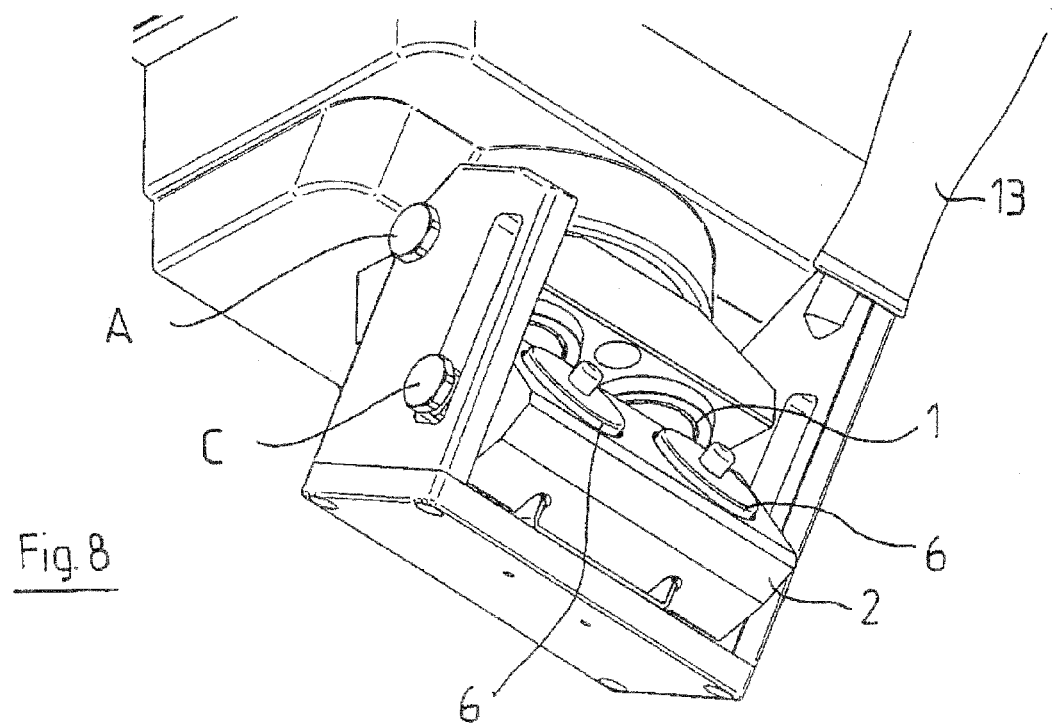
FIG. 8 is a perspective view of the open device.

In a first stage, lever 20 is positioned using handle 13 in a configuration similar to the one shown, for example, on FIG. 8 for receiving one or more packages 6 in moving part 2. The angular displacement of moving part 2 combined with vertical adjustment ensures excellent opening accessibility of receptacle 5 for introducing packages 6.

The operator then applies rotation to lever 20 which pivots on axle A.

The sliding pivot linkage causes moving part 2 to pivot on axle B until reaching the straight position by application to the surface of stop 23.

As the pivot movement exerted by the user on lever 20 continues, moving part 2 then starts a vertical translatory movement until fit up with fixed part 1 through element 9.

The position on FIG. 4 is reached via the position on FIG. 5.

At this stage, the hot water injection circuit has been opened by the movement of head 7 acting as a valve in body 17 as shown on FIG. 10.

Actuating the machine then causes the hot water to enter package 6. End-piece 4 may have been previously pierced by an appropriate device formed on injection head 7.

The beverage is discharged via zone 8.

The operator can then apply opposite rotation on lever 20 so as to bring moving part 2 to the open position.

By doing this, lever 20 generates firstly downward movement of element 9 corresponding to the position shown on FIGS. 2, 5 and 7.

Spring 11 will be of appropriate stiffness to facilitate this downward phase.

On a preferred arrangement, spring 11 also allows translation in the downward phase so as to produce the rotation of moving part 2 only at the end of travel.

Once the downward movement is completed, element 9 reaches a stop formed by a shoulder 12 at the end of guiding-housing 10. The translational movement stops and rotation of moving part 2 around axle B occurs until reaching the maximum angular displacement orientating moving part 2 towards the front of the machine to allow the operator access to package 6.

Pusher 14 starts the unloading of package 6 so as to facilitate handling by the operator, In an alternative arrangement, angular displacement of moving part 2 is such that package 6 is ejected by simple force of gravity.

REFERENCES

1. Fixed part
2. Moving part
3. Frame
4. End-piece
5. Receptacle
6. Package
7. Injection head
8. Beverage ejection zone
9. Element assembled in translation
10. Guiding-housing
11. Spring
12. Shoulder
13. Handle
14. Pusher
15. Opening
16. Spring
17. Injection body
18. Crown
19. Spring
20. Lever
21. Oblong hole
22. Longitudinal part
23. Stop

The invention claimed is:

1. A device for the extraction of a substance to make beverages by infusion, comprising:
   an infusion chamber consisting of a fixed part (1) and a moving part (2) that co-act to open and close the infusion chamber, a lever (20) rotatably mounted relative to an axle A and capable of driving the moving part (2) rotatably relative to an axle (B) through an action of a sliding pivot linkage between the lever (20) and the moving part (2),
   wherein the axle (B) of moving part (2) is situated on an element (9) translationally assembled relative to the fixed part (1) in order to bring together or move apart the moving part (2) from the fixed part (1), and
   wherein the element (9) translationally assembled comprises a longitudinal part (22) oriented according to a direction of the translation and a transversal part on which is located the axle (B) of the moving part (2).

2. The device according to claim 1, further comprising elastic means for pushing the translationally assembled element (9) towards a position in which the moving part (2) is moved away from the fixed part (1).

3. The device according to claim 1, wherein the translationally assembled element (9) has a rod fitted in a guiding-housing (10).

4. The device according to claim 3, wherein the guiding-housing (10) is formed in a rear face of the fixed part (1).

5. The device according to claim 1, wherein the sliding pivot linkage is situated between the axle (B) of the moving part (2) and the axle (A) of the lever (20).

6. The device according to claim 1, wherein the sliding pivot linkage is equipped with an oblong hole (21) formed in the lever (20) which co-acts with a drive axle (C) on which the moving part (2) is rotatably mounted.

7. The device according to claim 1, wherein a rear face of the fixed part (1) has a stop (23) that limits the rotation of the moving part (2).

8. The device according to claim 1, wherein the moving part (2) has at least one receptacle (5) for packages (6) of a substance to be infused and a base of the at least one receptacle (5) has an opening to allow a pusher (14) to pass into a volume of the at least one receptacle (5) to begin an extraction of the package (6) after use.

9. The device according to claim 8, wherein the pusher (14) is formed on the lever (20) so as to pass into the at least one receptacle (5) at an end of the rotation of the moving part (2).

10. The device according to claim 1, wherein the fixed part (1) consists of a body equipped with a head (7) injecting hot water into a package (6) of a substance to be infused, the head (7) moving to open or close a hot water injection circuit and able to apply on or pierce an end-piece (4) formed on the package (6) and an underside of the body being applied on an upper surface of the package (6) around the end-piece (4).

11. The device according to claim 10, wherein the a body is surrounded by a crown (18) being applied elastically on an upper face of a receptacle (5) receiving a package (6) in the moving part (2).

12. The device according to claim 1, wherein the rotational movement of the moving part (2) is between 45° and 90°.

13. The device according to claim 1, wherein the the rotational movement of the moving part (2) is greater than 90°.

14. A machine for making beverages incorporating the device according to claim 1.

15. The device according to claim 2, wherein the translationally assembled element (9) has a rod fitted in a guiding-housing (10).

* * * * *